June 25, 1935.  H. CHRETIEN  2,006,233
COMBINED PICTURE AND SOUND RECORDING AND REPRODUCTION IN MOTION PICTURES
Filed Jan. 28, 1929
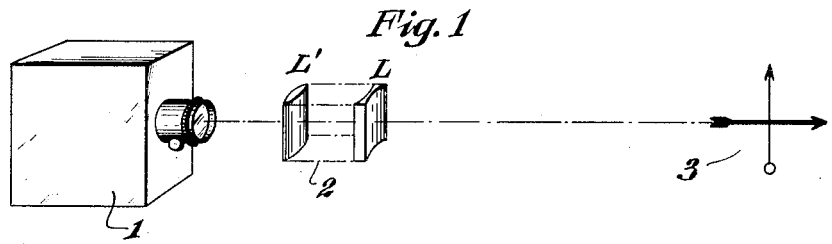
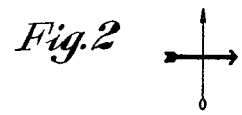
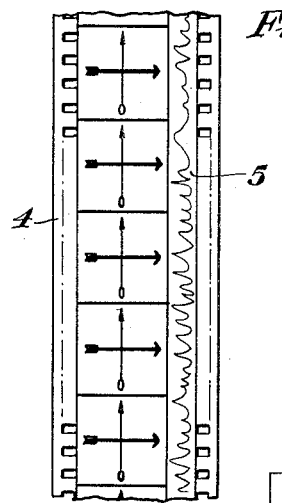
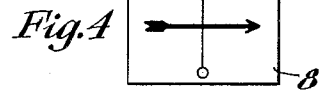
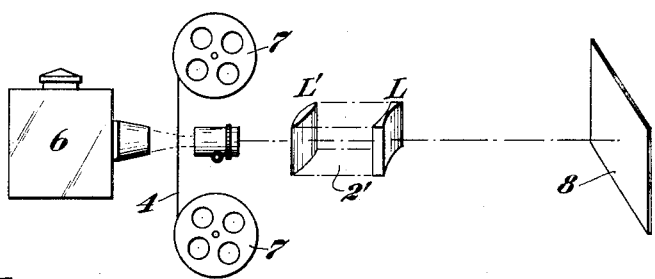
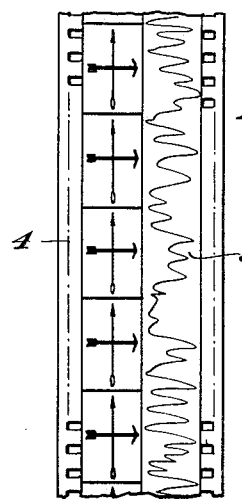
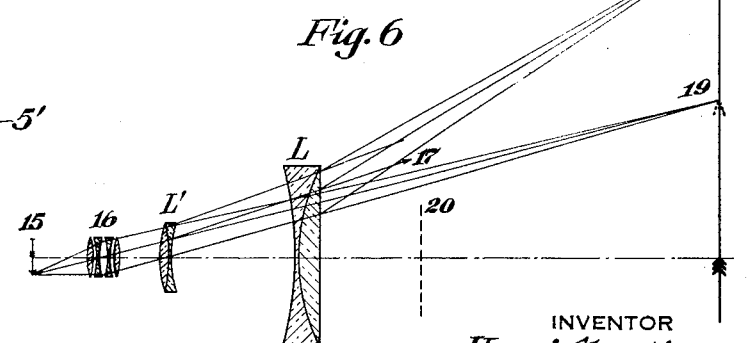
INVENTOR
*Henri Chretien,*
BY *Eyre Scott & Keel*
ATTORNEYS Patented June 25, 1935

2,006,233

UNITED STATES PATENT OFFICE 2,006,233

COMBINED PICTURE AND SOUND RECORDING AND REPRODUCTION IN MOTION PICTURES

Henri Chretien, Saint Cloud, France

Application January 28, 1929, Serial No. 335,565
In France April 29, 1927

1 Claim. (Cl. 88—16.2)

This invention relates to the taking and projection of motion pictures in conjunction with sound recording and reproduction and particularly to the forming upon a motion picture film of the images in juxtaposition with the sound record on the film and the subsequent projection of these images.

In the moving picture art the films have been standardized in size and dimensions to suit standard taking and projecting equipment generally and widely used, the size and dimensions of the film having been adapted to the particular requirements of the moving picture art. The dimensions and proportions of the standardized film are just sufficient to ordinarily take care of the minimum views to be taken and projected and accordingly there is very little room or space available, for the recording and reproduction of the synchronized sound with the result that when it has been attempted to incorporate on the standard films a sound record this has been effected only at the expense of the reduction of the necessary and desired space for recording the picture, and the sound record no matter how much it may be reduced in width objectionably preempts a portion of the film which should preferably be given over to the picture.

The present invention has for its main object the making of the combined sound and picture records on a standard motion picture film in a manner such that ample lateral space may be devoted to the sound record to meet practical conditions of recording and reproduction without in any way reducing the horizontal field of view of the pictures taken or without impairing the taking and reproduction of the pictures to any degree. In fact, as hereinafter and more particularly described, the horizontal field of view may even be substantially increased even though on standard films accompanied by a sound record on the film.

Moreover by means of my invention any of the desired and standard methods of sound recording on film may be employed, practically no restrictions being placed thereon by the questions of availability of space.

For a better understanding of the invention its objects, as above outlined, and others which will hereinafter appear, reference may be had to the accompanying drawing wherein Fig. 1 is a diagrammatic perspective view of a photographic apparatus adapted to take and record the pictures in the desired space on the film, Fig. 2 is a diagrammatic view of the laterally compressed image formed by the special apparatus which I make use of in this invention, Fig. 3 is a diagrammatic view of the film employing the images of the compressed images thus formed to go with a synchronous sound record on the same film, Fig. 3a is a similar view showing a still greater space allotted to the sound record, Fig. 4 is a view of the image projected on the screen from Fig. 3 or 3a showing the normal projection of the entire field.

Fig. 5 is a diagrammatic view of a projection apparatus and,

Fig. 6 is a view illustrating the optical principles involved in the taking and projecting of the picture.

Referring to the drawing I have indicated in Fig. 1 an ordinary motion picture camera 1 of any suitable standard construction embodying the usual photographic objective and at 2 I have indicated diagrammatically a unit which I term a local anamorphoser and which I use in combination with the camera 1 to take a picture or pictures of an object such, for example, as that indicated by the crossed arrows 3.

The local anamorphoser 2 is adapted to compress the view or image horizontally so as to get the whole view thereof recorded in a horizontally restricted space on the film. By means of this local anamorphoser with the particular adjustment thereof, both hereinafter described more in detail, I am able to compress the image into any desired space on the film with practically perfect definition both in taking and projection. The image of the object thus produced on the film is indicated in Fig. 2 the heavy lined horizontal arrow indicating the compressed image formed by the local anamorphoser of the view of the elongated heavy lined horizontal arrow shown in Fig. 1, which image is subsequently imaged by the camera objective upon the film.

In Fig. 3 I have indicated a film of standard size and dimensions having recorded to one side thereof a series of images corresponding to that indicated in Fig. 2 while alongside of them on the film I have indicated a sound record 4 of any form which is recorded for so-called synchronous reproduction and projection with the pictures. In the particular embodiment indicated in Fig. 3 the sound record 4 occupies substantially as much as one-fourth the available working space of the film. The panoramic or horizontal views are recorded on the film, as indicated above, to their full extent though compressed and distorted in the horizontal or lateral direction. In the projection of these pictures they are restored, however, to their full and normal form, as, for example, by means of a projection apparatus embodying an optical system similar to the optical system of Fig. 1. I have shown such a projection system in Fig. 5 where a standard projection apparatus is indicated at 6 with the film 4 carried by the reels 7 thereof for projection of the pictures according to standard practice.

At 2' I have indicated an optical system similar to the local anamorphoser 2 of Fig. 1, while the screen is indicated at 8. In Fig. 4 I have indicated a view of the screen 8 indicating the views of images as projected thereon in their restored and normal form.

I have omitted from the drawing the sound recording and reproducing apparatus for convenience in illustration. Any of the usual standard methods of recording a sound upon the film and reproducing the same may be used and, of course, any suitable or standard equipment may be used for this purpose.

The latitude given by my invention in the division and allocation of the film space to the two different kinds of records is indicated in Fig. 3a wherein half of the utilizable space of the film is devoted to the recording of the sound record 5'. In this figure the images of the pictures taken are still further compressed laterally or horizontally without, however, reducing the field of the view and with perfect definition both in the taking and projection of the view. While I have indicated in Fig. 3a that the picture may be compressed to such an extent as to be able to use half of the film for recording the sound my invention renders it possible to restrict the picture part of the film to a still greater extent with a corresponding increase in the space available for the recording of the sound. For example, I am able by my invention to compress the pictures to as much as 3 to 1 thereby allotting even more than half of the utilizable space of the film to the recording of the sound without impairing the taking and projection of the pictures.

Therefore, the lateral dimensions of the sound record may be increased by several times the space hitherto available for such records rendering it possible to use to its fullest advantage any method where large lateral dimensions of the sound records are relied upon to obtain the requisite perfection in such records and such a film has all the advantages consequent to a very greatly enlarged available space for recording the sound and perfect taking and reproduction of the pictures while the fullest views desired are effected notwithstanding the reduced available space on the film allocated thereto. In the application of the invention to standard films approximating the width of one inch for both the sound track and the images it is apparent that whether a sound track of greater width than the standard of 1/10 of an inch is used the views taken and projected are unreduced, notwithstanding the presence of the sound track.

Any suitable optical system may be employed for taking and exhibiting the picture thus compressed and restored, but I have achieved particularly good results in definition, etc...., by the use of the local anamorphoser 2 or 2' as a part of the optical system with the required adjustment thereof relative to the other parts of the optical system.

In Figs. 1 and 5 I have diagrammatically indicated the local anamorphoser 2 as including two systems of cylindrical lenses L and L' each composed of a single thin lens. They are separated at such a distance from each other that the image formed by the combination lies in the same frontal plane as the object. Their focal lengths are further so chosen as to give the desired compression to the image.

In Fig. 6 is illustrated diagrammatically a cross-section of the anamorphoser system assumed to be reduced to two lens system L and L'. Between the focal lengths of these lenses and the distance which separates them such ratios are laid down as enable the following conditions to be satisfied:

1. The image of the frontal object plane produced by the plane sheets of luminous rays which are propagated in planes at right angles to the common plane of the axes of the cylindrical lens should register with the object plane itself.

In other words, this plane should be one of the two planes of Bravais of the combination viz. one of the double planes of the homographic correspondence. The plane containing the virtual image produced by the anamorphoser of a plane object lying in a frontal plane should coincide with this object plane itself. This plane is indicated at 18, and 19 in Fig. 6.

2. The enlargement of this image should have a given value. For example, in Fig. 3 the enlargement is approximately ¾ while in Fig. 3a it is about ½.

If the object plane is at infinity the anamorphoser is anastigmatic when the distance between its two component lenses is equal to the sum of their algebraic focal lengths. This distance apart must be decreased if the object is at a lesser distance than infinity.

Referring to Fig. 6, 16 is an ordinary photographic objective. It might also be a projection lens or might be replaced by a telephoto objective. L' is a positive cylindrical lens composed of two cylindrical elements, cemented or uncemented, with the negative element in front or behind and both elements having their axial planes perpendicular to the plane of the paper and passing through the axis of the system. L is a negative cylindrical lens composed of two elements, cemented or uncemented, the positive one of which is either in front or behind. Both have their axial planes perpendicular to the plane of the paper and passing through the axis of the system. The focal lengths of the lenses L' and L and their distances apart are so chosen that the second focal plane of L and the first focal plane of L' coincide in plane 20 when the anamorphoser is to be anastigmatic for an object at infinity.

The focal lengths are further so chosen that the angle of inclination to the axis of rays entering the system at L is twice that of the rays leaving the system at L'. The compression is ½. It might practically have been chosen to have any other value between 1 and ⅓.

In the films shown in Figs. 3 and 3a I have assumed that the field of view of the pictures taken and projected on the screen 8 are the normal views which are ordinarily taken in moving picture work. This field of view, however, may be substantially increased over that ordinarily taken and projected. For example, the films 4 and 4' may embody panoramic views combined with the sound record. Thus this renders possible the taking of close-ups of two or more persons standing in conversation with each other together with the allocation of the necessary space for the recording of the conversations or other sounds with perfect taking and projection of the laterally extended close-ups and with adequate space for the recording and reproduction of the synchronized sounds, the close-ups being compressed or distorted laterally on the film but restored to their normal proportions upon projection so as to be as much as twice as wide as the ordinary motion picture frame while still leaving ample room for the sound record.

My invention is not limited to having the optical compression take place at the time of first imaging and fixing the object upon a film. It is possible to make use of film of other than standard dimensions having thereon undistorted images whose dimensions are not proportional to the standard proportions of 4 to 3 and to compress such images by printing them through the use of an anamorphoser so as to compress the one dimension or the other to conform to the 4 : 3 ratio of standard motion picture film.

In the preparation of the definitive image or scene upon the film it is not necessary that the whole of the scene thus fixed on the film should be fixed upon it at one time or from views taken at one time. The scene upon the film may be composed of portions taken at different times and even places and the whole separately or simultaneously compressed so as to build up a laterally or vertically extended composite scene. This may be done at some stage in the printing of pictures from several standard negatives. It is understood that in Fig. 3 the pictures may be of such composite character.

I have shown in Figs. 3 and 3a the sound record or sound track 5, 5' as disposed on the right hand side of the film (looking through the back), but, of course, this arrangement may be reversed if desired.

This application is a continuation in part of my application filed January 9, 1928, Serial No. 245,558.

I claim:

The improvement in the art of protected sound pictures which comprises first determining what portion of the available width of the film shall be devoted to the sound track, taking a picture while optically compressing it laterally to bring it within the space of the remaining portion of such available width, imposing the sound track upon said predetermined portion, and projecting said picture with optical restoration to its normal proportions while simultaneously reproducing the sound, whereby satisfactory uniformity and quality of sound reproduction may be obtained without sacrifice of size of projected picture.

HENRI CHRETIEN.